(No Model.)
E. H. KORSMEYER.
CORN PLANTER.
No. 351,925. Patented Nov. 2, 1886.
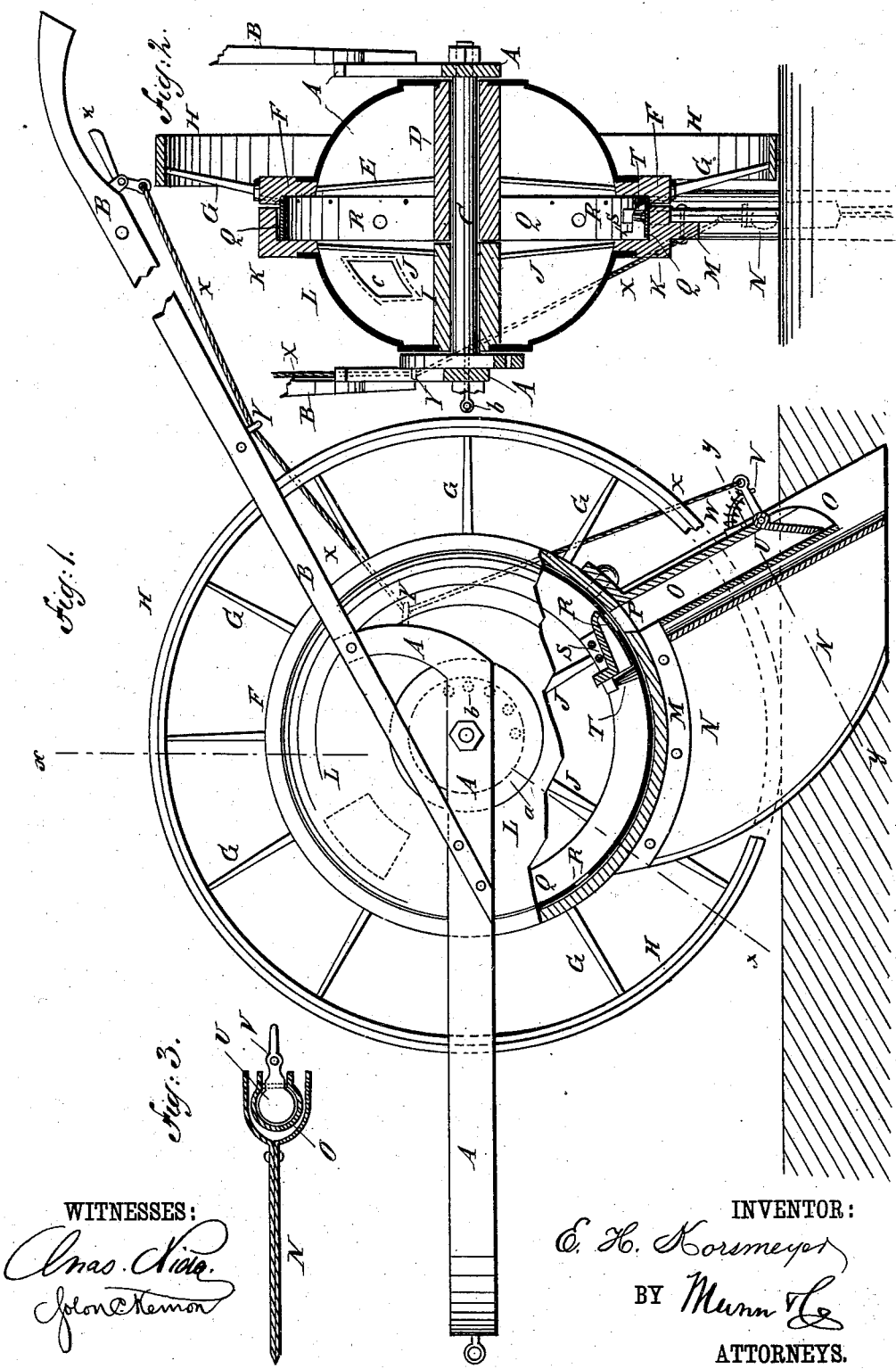
WITNESSES:
INVENTOR:
E. H. Korsmeyer
BY Munn & Co.
ATTORNEYS.

UNITED STATES PATENT OFFICE.

ERNEST H. KORSMEYER, OF EVANSVILLE, INDIANA.

CORN-PLANTER.

SPECIFICATION forming part of Letters Patent No. 351,925, dated November 2, 1886.

Application filed February 12, 1886. Serial No. 191,761. (No model.)

*To all whom it may concern:*

Be it known that I, ERNEST HERMAN KORSMEYER, of Evansville, in the county of Vanderburg and State of Indiana, have invented a new and useful Improvement in Corn-Planters, of which the following is a full, clear, and exact description.

Reference is to be had to the accompanying drawings, forming a part of this specification, in which similar letters of reference indicate corresponding parts in all the figures.

Figure 1 is a side elevation, partly in section, of my improved planter. Fig. 2 is a sectional front elevation of the same, taken through the line $x\ x$, Fig. 1. Fig. 3 is a sectional plan view of the cutter and seed-dropping tube, taken through the line $y\ y$, Fig. 1.

The object of this invention is to provide corn-planters simple in construction, convenient in use, reliable in operation, and not liable to get out of order.

The invention consists in the construction and combination of the various parts of the planter, as will be hereinafter fully described.

A represents the frame of the planter, which is formed of a U-shaped bar having an eye or hook at the center of its bend to receive the draft. The rear ends of the arms of the bar A are bent upward, and to them are attached the handles B, the lower ends of which are attached to the arms of the bar A at a little distance from their ends.

To the arms of the bar A, at a little distance from their rear ends, are secured the ends of the axle C, upon the left-hand part of which is placed a hub, D. The hub D, at a little distance from its inner end, is provided with spokes E, having at their outer ends a rim, F, made with a narrow inwardly-projecting flange. The rim F is provided with spokes G, having a rim, H, at their outer ends. The hub D, the spokes E and G, and the rims F and H are preferably cast in one piece.

Upon the right-hand part of the axle C is placed a hub, I, which is provided at a little distance from its inner end with spokes J, having at their outer ends a rim, K, made with an inwardly-projecting flange somewhat wider than the flange of the rim F, and coinciding therewith.

To the outer ends of the hubs D I are attached the centers of casings L, which are curved inward and are secured at their edges to the rims F K, thus forming the seed-box.

Upon the lower part of the rim K is formed a section of a flange, M, to which is bolted a plate, N, to serve as a cutter to open a channel to receive the seed. The rear edge of the cutter N is forked to form a channel to conduct the seed to the ground. In the upper part of the channel in the rear edge of the cutter N is placed a tube, O, the upper end of which is secured in an opening, P, in the flange of the rim K.

To the inner surface of the flange of the rim F is secured by bolts or rivets a band, Q, which rests against the inner surface of the flange of the rim K, and is made of such a width as to cover the said flanges and fit in between the said rims, as shown in Fig. 2.

In the band Q, at suitable distances apart, are formed openings R, to receive seed and convey it to the discharge-opening P, which is covered by a cap-plate, S, secured to the rim K, with its forward end raised sufficiently to allow the seed to be carried in beneath it, and with its rear end close to the band Q to prevent the seed from being carried past the discharge-opening P and from entering beneath the said rear end. The band Q is kept from carrying out any more seed than is contained in the openings R by a small brush, T, secured to the forward end of the cap-plate S.

The lower end of the seed-dropping tube O is provided with a hinged valve, U, the stem of which projects and is perforated to receive a curved guide-rod, V, attached to the said tube O. Upon the curved rod V is placed a spiral spring, W, one end of which rests against the tube O, and its other end rests against the stem of the valve U, so that the said valve will be closed and held closed by the elasticity of the said spring.

To the stem of the valve U is attached the end of a small cord or chain, X, which passes through guide-eyes Y, attached to the frame A and to the right-hand handle B, and its upper end is attached to the end of the short arm of a small elbow-lever, Z, pivoted at its angle to the right-hand handle B in such a position that it can be readily operated by the hand that holds the said handle. With this construction the valve U can be fastened open, when the seed will be dropped as each opening R of the band Q comes over the opening P of the rim K, or the small lever Z can be operated by the plowman as each second or third opening R comes opposite the opening P, according as he wishes to plant the seeds at a less or greater distance apart.

To the outer end of the hub I is attached a plate, $a$, which has a number of holes formed through it to receive a pin, $b$, which also passes through a hole in the frame A to hold the hub I and its attachments from turning upon the axle C. With this construction, by withdrawing the pin $b$ and turning the hub I upon the axle C the cutter N can be adjusted to enter the ground to any desired depth, and can be raised and secured above the ground for convenience in passing obstructions, turning around, and passing from place to place.

The seed is introduced into the seed-box through an opening in the upper part of the right-hand casing L, which opening is closed by a cover, $c$. With this construction the hub D, spokes E and G, and rims F and H form a wheel upon which the planter travels, and which revolves upon the axle C, while the hub I, spokes J, and rim K remain stationary, except when moved to adjust the cutter N.

Having thus fully described my invention, I claim as new, and desire to secure by Letters Patent—

1. In a corn-planter, the combination, with the axle C, the hub D, the spokes E G, and the rims F H, of the hub I, spokes J, rim K, band Q, and casing L, substantially as herein shown and described.

2. In a corn-planter, the combination, with the frame A, the handles B, and the axle C, of the hub D, spokes E G, and rims F H, the hub I, spokes J, and rim K, the band Q, having seed-receiving apertures, the casings L, attached to the hubs and rims, and the plate $a$ and pin $b$, substantially as herein shown and described.

3. In a corn-planter, the combination, with the rim K, having flange M and aperture P, of the cutter N, having forked rear edge, and the tube O, substantially as herein shown and described, whereby a channel is opened in the ground and the seed is conducted into the channel, as set forth.

ERNEST H. KORSMEYER.

Witnesses:
GEORGE VOEGELIN,
KARL STEELER.